US008999278B2

(12) United States Patent
Chang et al.

(10) Patent No.: US 8,999,278 B2
(45) Date of Patent: Apr. 7, 2015

(54) METHOD AND APPARATUS FOR ON-SITE PRODUCTION OF LIME AND SORBENTS FOR USE IN REMOVAL OF GASEOUS POLLUTANTS

(75) Inventors: Ramsay Chang, Mountain View, CA (US); Yongqi Lu, Urbana, IL (US); Massoud Rostam-Abadi, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 445 days.

(21) Appl. No.: 12/722,497

(22) Filed: Mar. 11, 2010

(65) Prior Publication Data

US 2011/0223088 A1    Sep. 15, 2011

(51) Int. Cl.
| | | |
|---|---|---|
| *B01D 53/79* | (2006.01) | |
| *C04B 2/10* | (2006.01) | |
| *B01D 53/60* | (2006.01) | |
| *B01D 53/64* | (2006.01) | |
| *B01D 53/68* | (2006.01) | |
| *B01D 53/72* | (2006.01) | |
| *B01J 20/04* | (2006.01) | |
| *B01J 20/20* | (2006.01) | |
| *B01J 20/28* | (2006.01) | |
| *B01J 20/30* | (2006.01) | |
| *B01D 53/10* | (2006.01) | |
| *C04B 111/00* | (2006.01) | |

(52) U.S. Cl.
CPC . *C04B 2/10* (2013.01); *B01D 53/60* (2013.01); *B01D 53/64* (2013.01); *B01D 53/685* (2013.01); *B01D 53/72* (2013.01); *B01J 20/041* (2013.01); *B01J 20/20* (2013.01); *B01J 20/28004* (2013.01); *B01J 20/28057* (2013.01); *B01J 20/3078* (2013.01); *B01J 20/3085* (2013.01); *B01D 53/10* (2013.01); *B01D 2251/402* (2013.01); *B01D 2251/404* (2013.01); *B01D 2251/606* (2013.01); *B01D 2253/102* (2013.01); *B01D 2253/112* (2013.01); *B01D 2253/304* (2013.01); *B01D 2257/2042* (2013.01); *B01D 2257/2045* (2013.01); *B01D 2257/2047* (2013.01); *B01D 2257/302* (2013.01); *B01D 2257/404* (2013.01); *B01D 2257/60* (2013.01); *B01D 2257/602* (2013.01); *B01D 2257/70* (2013.01); *B01D 2258/0283* (2013.01); *B01D 2258/0291* (2013.01); *B01J 2220/42* (2013.01); *C04B 2111/00017* (2013.01)

(58) Field of Classification Search
USPC ............ 423/210, 230, 239.1, 240 S, 244.07, 423/245.1
See application file for complete search history.

(56) References Cited

U.S. PATENT DOCUMENTS

| | | | |
|---|---|---|---|
| 3,662,523 A | 5/1972 | Revoir et al. | |
| 4,540,553 A * | 9/1985 | Hagiwara et al. | 423/230 |
| 5,158,580 A | 10/1992 | Chang | |
| 5,435,980 A | 7/1995 | Felsvang et al. | |
| 5,505,766 A | 4/1996 | Chang | |
| 5,827,352 A | 10/1998 | Altman et al. | |
| 6,200,543 B1 * | 3/2001 | Allebach et al. | 423/220 |
| 6,391,266 B1 | 5/2002 | Lavely, Jr. | |
| 6,558,454 B1 | 5/2003 | Chang et al. | |
| 6,818,043 B1 | 11/2004 | Chang et al. | |
| 6,878,358 B2 | 4/2005 | Vosteen et al. | |
| 6,932,956 B2 * | 8/2005 | Jia | 423/569 |
| 7,141,091 B2 | 11/2006 | Chang | |
| 7,249,564 B2 | 7/2007 | Lissianski et al. | |
| 7,282,189 B2 * | 10/2007 | Zauderer | 423/220 |
| 7,435,286 B2 | 10/2008 | Olson et al. | |
| 2002/0061271 A1 | 5/2002 | Zauderer | |
| 2004/0003716 A1 | 1/2004 | Nelson | |
| 2006/0204430 A1 | 9/2006 | Bool, III et al. | |
| 2010/0004119 A1 | 1/2010 | Gadkaree | |
| 2011/0223082 A1 | 9/2011 | Chang et al. | |

OTHER PUBLICATIONS

Borgwardt, R. H.; Calcination Kinetics and Surface Area of Dispersed Lime Particles; Aiche J.; 1985, 103-111, vol. 31, No. 1.
Borgwardt, R. H. et al.; Effect of the Specific Surface Area on Reactivity of CaO and SO2; Aiche J.; 1986, 103-111, vol. 32, No. 2.
Hu, N. et al.; Calcination of Pulverized Limestone Particles Under Furnace Injection Conditions; Fuel; 1996, 177-186, vol. 75, No. 2.
Campbell, T. et al.; Mercury Control with Activated Carbon: Results from Plants with High SO3; 7th Power Plant Air Pollutant Control "Mega" Symposium 2008; 774-790; vol. 2.
Auer, et al., Carbons as Supports for Industrial Precious Metal Catalysts, Applied Catalysis A. General, 1998, 173, Elsevier.
Gryglewicz et al., Mesoporous Actived Carbons from Ca and Fe Exchanged Sub-Bituminous and Bituminous Coals, Letters to the Editor Carbon 42, 2003,667-691, 42, Elsevier.
Li et al., Oxidation of Nitric Oxide to Nitrogen Dioxide Over Ru Catalysts, Applied Catalysis B: Environmetal, 2009, 224-231, 88, Elsevier.

(Continued)

*Primary Examiner* — Stuart Hendrickson
(74) *Attorney, Agent, or Firm* — Owens Tarabichi LLP

(57) ABSTRACT

The invention provides various methods for removing gas phase pollutants by calcining limestone or dolomite using flash calcination to produce a high surface area lime or hydrated lime and directly adding the lime or hydrated lime to a gas stream containing gas phase pollutants. In other methods, the production of an activated sorbent, such as activated carbon, is combined with the production of the high surface area lime or hydrated lime and directly added to a gas stream containing gas phase pollutants. The combination of lime or hydrated lime and an activated sorbent enhances the removal of gas phase pollutants such as those from a coal-fired boiler flue gas.

31 Claims, 5 Drawing Sheets

(56) References Cited

OTHER PUBLICATIONS

Shiba, et al., Catalytic Oxidation of NO to NO2 Over Cr/TiO2 and Cu/TiO2 Under Oxidizing Atmosphere, 1996, 133-137, 58, Elsevier.

Tarkovskaya, et al., Catalytic Properties of Metal-Containing Oxidized Coal Catalysts in Some Redox Reactions, Theoretical and Experimental Chemistry, 223-226, 33/4, Plenum.

Chang, Controlling Mercury Emissions from Coal-Fired Power Plants, Jul. 2009, 1-5, Air and Waste Management Association.

\* cited by examiner

METHOD AND APPARATUS FOR ON-SITE PRODUCTION OF LIME AND SORBENTS FOR USE IN REMOVAL OF GASEOUS POLLUTANTS

BACKGROUND

1. Background of the Invention

The invention relates generally to the production of high surface area lime or hydrated lime that is directly added to a gas stream to react with gaseous pollutants. More specifically, the invention is directed to a method and apparatus for the on-site production of a high surface area lime or hydrated lime, as well as activated carbon, that are directly added to a flue gas stream produced by a coal-fired boiler or a waste incinerator to remove certain gaseous pollutants such as acid gases and air toxics, such as mercury and other air toxics found in trace amounts.

2. Description of Related Art

Controlling emissions of certain gaseous pollutants, such acid gases and air toxics, in flue gases generated from coal-fired power plants is an important concern. In such flue gases, certain air toxics and other species can be distributed in both the vapor phase and the solid phase, thereby requiring the removal of both solid matter, such as particulate matter, as well as vapor phase species. Further, certain air toxics (e.g., mercury), certain acid gases (e.g., $SO_3$, HCl), and other air toxics (e.g., arsenic, selenium, nickel, lead, organics, etc.) that are present in the vapor phase of such gases are typically found in very low concentrations making removal difficult.

Sorbents are sometimes used to remove certain pollutants from gas streams. For example, sorbents may be injected into a gas stream and collected downstream after adsorbing a targeted vapor phase contaminant. Alternatively, a packed bed, an entrained bed, or fluidized bed may use a sorbent to adsorb a given vapor phase pollutant from a gas stream.

Calcium-based sorbents such as limestone, dolomite, lime, hydrated lime, calcium acetate, and calcium magnesium acetate are used, for example, in the removal of sulfur-based vaporous pollutants, such as $SO_2$ and $SO_3$, from coal-fired power plant flue gases. These sorbents can also be effective in removing other acid gases, such as HCl and $H_2S$, as well as vaporous air toxic species including metal compounds such as selenium, arsenic, nickel, lead, and others found in trace amounts in coal-fired power plant flue gases. However, the process by which hydrated lime or lime, in particular, is produced is energy intensive, making these sorbents relatively expensive.

Regarding the removal of mercury, activated carbon is a sorbent used for sorption of mercury species from coal combustion flue gases and other industrial gas streams. The results from pilot and full-scale field demonstration tests have revealed that at a carbon loading of less than 5 lb/MMft$^3$, mercury removal greater than 90% is achievable for flue gases generated from burning low-sulfur coals. However, mercury removal efficiency for flue gases generated from burning high-sulfur coals, which commonly contain greater than 10 ppm $SO_3$, a level significantly higher than that in flue gases generated from lower sulfur coals, have been reported to be less than 50% at comparable activated carbon loadings. By co-injecting an alkali sorbent such as lime or hydrated lime together with activated carbon, the effectiveness of the activated carbon in a high $SO_3$ gas stream can be significantly enhanced. (See Sjostrom, S., et al.,"Mercury Control with Activated Carbon: Results from Plants with High $SO_3$," paper # 79, presented at the Mega Symposium, Baltimore, Md., August, 2008, the entirety of which is incorporated by reference herein.)

In view of the foregoing, there is a need for an improved, low-cost method for making lime or hydrated lime to be used as an effective sorbent for removing various gaseous pollutants, including various sulfur oxides, acid gases, and air toxic compounds from flue gases. Further, there is a need for improving the effectiveness of activated carbon as used for removing mercury species from flue gases.

SUMMARY OF THE INVENTION

The invention provides various methods for removing gas phase pollutants by calcining limestone or dolomite on-site using flash calcination to produce a high surface area lime or hydrated lime and directly adding the lime or hydrated lime to a gas stream containing gas phase pollutants. In other methods, the production of an activated sorbent, such as activated carbon, is combined with the production of the high surface area lime or hydrated lime and directly added to a gas stream containing gas phase pollutants. The combination of lime or hydrated lime and an activated sorbent enhances the removal of gas phase pollutants such as those from a coal-fired boiler flue gas.

In one embodiment, the invention provides a method for producing a high surface area lime or hydrated lime, comprising feeding limestone or dolomite optionally into a pulverizer and then into a chamber in which the limestone or dolomite is subjected to flash calcination to produce a high surface area lime or optionally adding water or steam to hydrate the lime to produce hydrated lime. In another embodiment, this method is combined with the production of an activated sorbent and comprises optionally feeding limestone or dolomite into a pulverizer; optionally feeding a sorbent into a second pulverizer; optionally pulverizing the limestone or dolomite and the sorbent; calcining the limestone or dolomite using flash calcination to produce lime, or optionally adding water or steam to hydrate the lime to produce hydrated lime, and activating the sorbent to produce an activated sorbent.

In another embodiment, the invention provides a method for removing gaseous pollutants from a gas stream, comprising adding a calcium-based sorbent to a chamber; suspending the calcium-based sorbent in the chamber; calcining the calcium-based sorbent in the chamber to produce suspended lime; optionally adding water or steam to hydrate the suspended lime to produce suspended hydrated lime; feeding the suspended lime or hydrated lime into a gas stream comprising at least one gaseous pollutant; and reacting the lime or hydrated lime with the at least one gaseous pollutant to remove the at least one gaseous pollutant from the gas phase of the gas stream.

In another embodiment, the invention provides a method for removing gaseous pollutants from a gas stream comprising feeding limestone or dolomite and a sorbent precursor such as coal and biomass into a chamber; calcining the limestone or dolomite using flash calcination to produce suspended lime and activating the sorbent precursor to produce a suspended activated sorbent; optionally adding water or steam to hydrate the suspended lime to produce suspended hydrated lime; feeding the suspended lime or hydrated lime and the activated sorbent into a gas stream comprising gaseous pollutants; reacting the lime or hydrated lime with at least one gaseous pollutant and adsorbing a second gaseous pollutant with the sorbent, thereby removing the gaseous pollutants from said gas stream.

The various methods provide a source of a high surface area lime or hydrated lime that can be used to react and remove certain gaseous pollutants from a gas stream, such as $SO_2$ and $SO_3$ in coal-fired power plant flue gases or $H_2S$ from industrial gas streams. In addition, the various methods can be used to concurrently produce an activated sorbent that can be used to remove additional gaseous pollutants from a gas stream, such as the production of activated carbon to remove mercury in coal-fired power plant flue gases. In addition, the various methods can be implemented using the same equipment and can be implemented on-site where the resulting gas stream carrying the lime or hydrated lime and activated sorbent is fed directly into a gas stream for removal of certain gaseous pollutants.

DETAILED DESCRIPTION OF THE INVENTION

Figure 1:
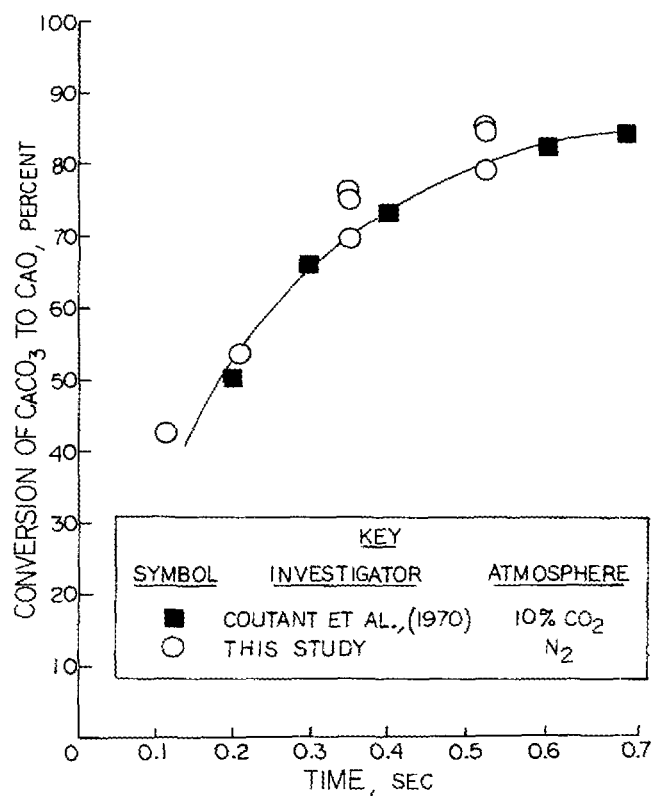
FIG. 1 is a graph illustrating a comparison of calcination rates in dispersed-particle flow reactors.

The following describes various exemplary embodiments of methods and apparatuses for the production of high surface area lime or hydrated lime that is directly added to a gas stream to react with gaseous pollutants and remove them from the gas phase. These embodiments are described in conjunction with the accompanying drawings, which are not necessarily drawn to scale. Further, the following description is not intended to be limiting, as it will be apparent to one of skill in the art that certain modifications may be made to the various exemplary embodiments. Accordingly, such modifications are intended to be within the scope of the present invention.

Generally, the following describes methods and equipment for producing, low cost, high surface area lime or hydrated lime for use as a sorbent in removing certain pollutants, such as acid gases and air toxics, from a gas stream, such as a flue gas stream from a coal-fired boiler or a waste incinerator. In some embodiments, the methods for producing the lime or hydrated lime are performed on-site or at the location where the gas stream is to be treated. In these embodiments, the lime or hydrated lime is produced and added directly to the gas stream. In some embodiments, a sorbent precursor, such as a carbonaceous material, may be converted into an activated sorbent in conjunction with the production of the lime or hydrated lime and also directly added to a gas stream to remove certain gaseous pollutants, such as air toxics, from the gas phase. For example, a carbonaceous material may be converted into activated carbon that can be used to adsorb mercury from the gas stream.

As an initial premise, it should be appreciated that some of the key properties of a sorbent are the active sites or accessible internal surface area and accessible pore volume of the sorbent. These properties contribute to increased reactivity of the sorbent. For example, increasing the surface area of the sorbent exposes more of the sorbent to the gas stream, thereby providing more area for sorption of the vaporous pollutant onto the surface of the sorbent.

Commercially available limes have relatively low surface areas. These limes are produced from limestone (a stone composed mainly of $CaCO_3$) or dolomite (a stone composed of mainly $CaCO_3MgCO_3$). The limestone or dolomite is calcined (i.e., thermally decomposed) to produce CaO (referred to as "lime" or "quicklime") or, with the subsequent addition of water, $Ca(OH)_2$ (referred to as "slaked lime" or "hydrated lime"). Specifically, limestone or dolomite are calcined at temperatures greater than 850° C. to produce CaO or CaOMgO, respectively, according to the following reactions:

$$CaCO_3 \rightarrow CaO + CO_2 \quad (1)$$

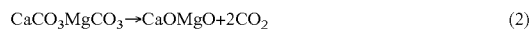

$$CaCO_3MgCO_3 \rightarrow CaOMgO + 2CO_2 \quad (2)$$

In commercial practice, the calcination process is conducted using a direct-fired rotary kiln that uses coal or natural gas as its fuel. The particle size of the feed limestone is approximately less than 4 inches and has a specific surface area of less than 1 m²/g. The calcination temperature is about 850-1000° C., and the calcination residence time is about 2-4 hours. Lime produced commercially under such conditions produces a relatively low specific surface area of between 1-3 m²/g.

The time-temperature history during these calcination reactions greatly impacts the conversion of the raw stones to oxides and the amount of surface area of the resulting oxides (CaO and CaOMgO). The partial pressure of $CO_2$ in the calcination gas determines the temperature at which the calcination reaction begins and the rate at which the calcination reaction proceeds. The main reason for the low surface area is grain growth by sintering, whereby the individual grains in the particles adhere to each other resulting in grain growth and a lower surface area per volume.

However, grain growth by sintering and, therefore, surface area deactivation are much less pronounced when pulverized limestone or dolomite (e.g., limestone or dolomite having a particle size of less than 100 μm) is calcined under rapid heating, short residence time process conditions. For example, specific surface areas of calcium oxide sorbents formed by calcination of pulverized limestone or dolomite having a particle size of approximately 10-90 μm at 850-1075° C. and with a residence time of less than 1 second ranged from 50-63 m²/g as reported by R. H. Borgward, AICHE J., 1985, 31, 1, 103-111, Table 2, which is incorporated by reference herein in its entirety.

FIG. 1 is a graph illustrating a comparison of calcination rates in dispersed-particle flow reactors. These results are based on the use of 90 μm limestone particles and a calcination temperature of 1090° C. and were reported in R. H. Borgward, 1985, AICHE J., 31, 1, 103-111. The surface area of lime produced from 50 μm limestone at 1000° C. and less than 0.6 second calcination time was reported between 55 and 59 m²/g.

Further, heat transfer calculations reveal that when a 100 μm limestone particle is injected into a 1000° C. gas stream, the center of the particle reaches 1000° C. in less than 200 ms. Experimental data and model predictions indicate that greater than 90% of calcination is achievable for limestone particles less than 63 μm at 1000° C. and 0.6 second reaction time. (See Naiyi Hu and Allen W. Scaroni, Fuel, 75(2), pp. 177-186.)

Figure 2:
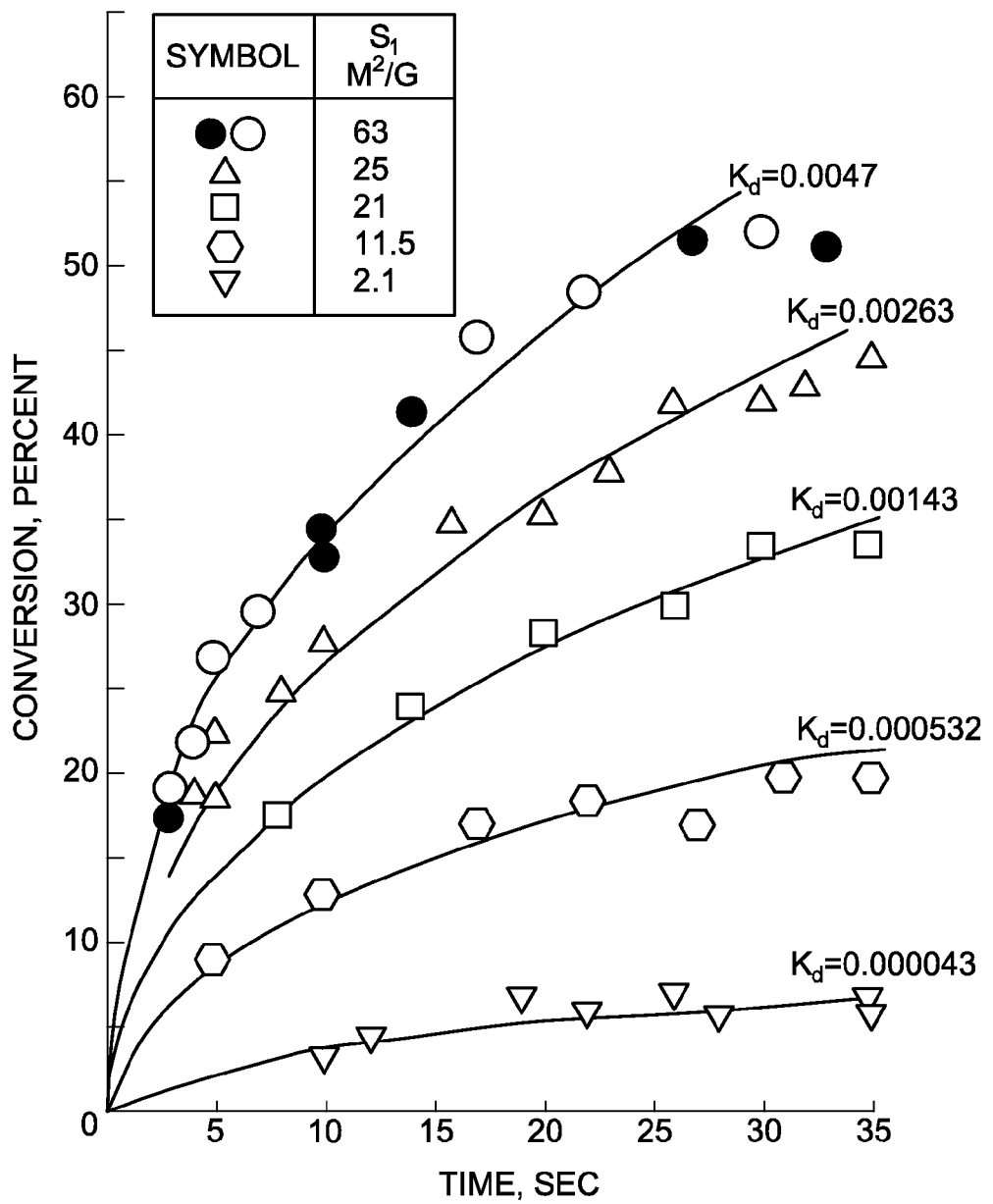
FIG. 2 is a graph illustrating the $SO_2$ reactivity of CaO as a function of its specific surface area.

FIG. 2 is a graph illustrating the $SO_2$ reactivity of CaO as a function of its specific surface area. These results were produced from tests conducted at 800° C., $P_{SO2}=304$ Pa, $K_d$ values in $S^{-1}$ and were reported in R. H. Borgward and K. R. Bruce, 1986, AICHE J., 32, 2, 239-246, which is incorporated herein by reference in its entirety.

Accordingly, in one embodiment, lime can be produced using a flash calcination process ("FCP") to obtain a relatively high surface area lime that can be used to remove certain gaseous pollutants from a gas stream. In the FCP, pulverized limestone or dolomite having a particle size of approximately less than 100 μm, or a mixture thereof, is thermally decomposed (referred to as "calcination") using a rapid heating rate. By using a rapid heating rate, the surface area of the resulting lime product is significantly increased compared to conventional calcination processes. Specifically, limestone particles are subjected to simultaneous calcination and sintering reactions. The calcination rate, however, dominates the sintering rate when particles having a size of approximately less than 100 μm are calcined at a fast heating rate below 1010° C.

Optionally, water or steam can be added to cool the resultant product or to hydrate the lime if desired, thereby producing hydrated lime ($Ca(OH)_2$) or to do both. Importantly, the FCP can be performed to produce the calcined lime on-site or at the location where it will be used. For example, the FCP can be performed on-site at a coal-fired power plant where the resulting lime or hydrated lime can be directly added to the flue gas that needs to be treated.

The FCP can also be used in conjunction with on-site equipment to activate another sorbent. For example, a sorbent precursor, such as a carbonaceous material, could be activated and used as a sorbent to remove certain pollutants, such as air toxics, from a gas stream. One example is the conversion of coal into activated carbon. Other feedstocks that could be activated using this equipment include biomass materials such as different nut shells, corn-to-ethanol byproducts, waste tires, petroleum coke, and any carbonaceous materials that can be processed into activated carbon. In addition, other inorganic materials such as bicarbonates and clay minerals that can be processed into porous sorbents can be used.

It should be appreciated that the FCP equipment can be used to either produce a high surface area lime or to activate a sorbent precursor or both. Further, the FCP can be used to produce lime and an activated sorbent at the same location at different times or concurrently. Further, it should be appreciated that the FCP can be conducted on-site where either the lime or sorbent or both as produced by the FCP can then be directly added to a gas stream to remove certain gaseous pollutants. Such use of this equipment to produce both lime and an activated sorbent such as activated carbon may be beneficial, for example, at a coal-fired power plant that produces a flue gas containing both acid gases, such as $SO_2$ and $SO_3$, and air toxics, such as mercury species. Such dual or multiple uses of the FCP and related equipment for both the production of lime and a activated sorbent may provide certain cost savings.

Figure 3:
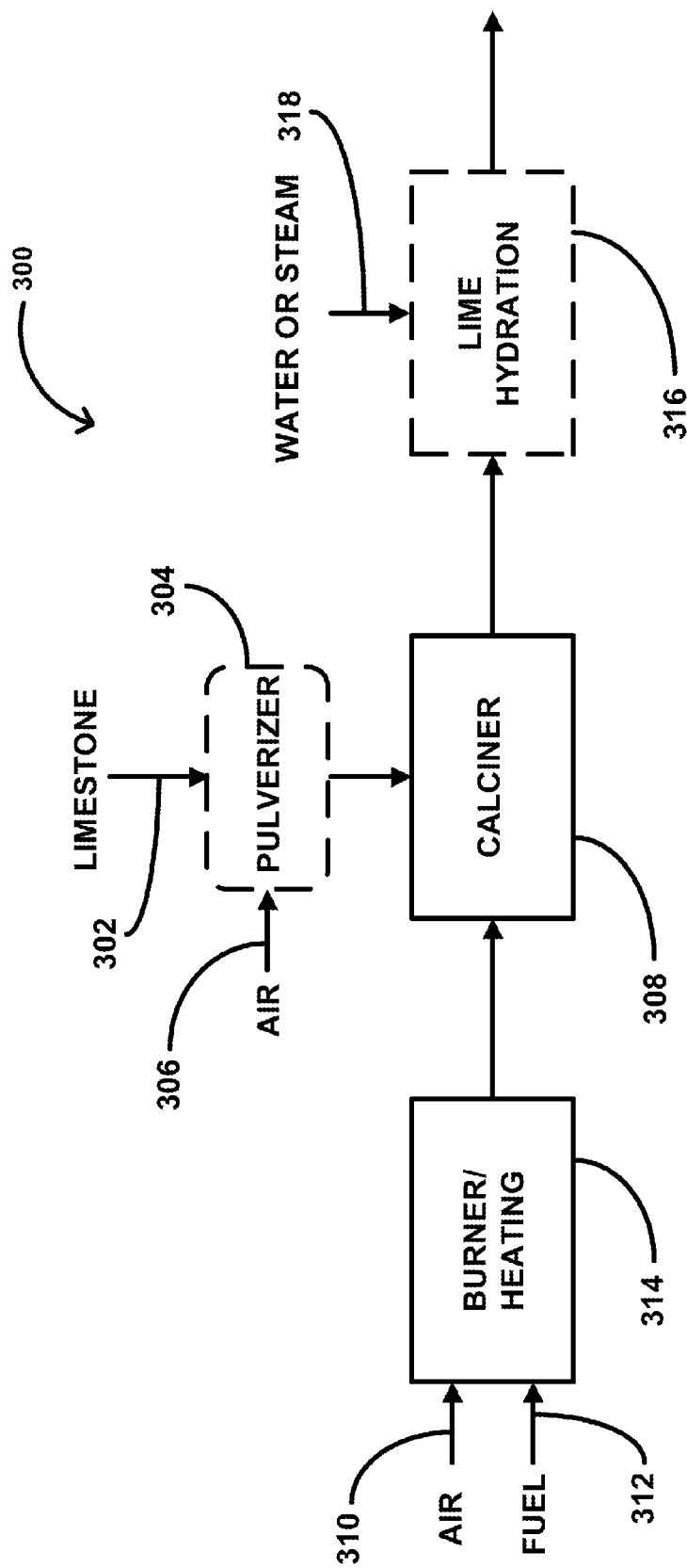
FIG. 3 is a process flow diagram for producing a high surface area lime or hydrated lime in accordance with one embodiment.

FIG. 3 is a process flow diagram for producing a high surface area lime or hydrated lime in accordance with one embodiment. In this process 300, limestone 302 is optionally fed to a pulverizer 304. Generally, the pulverizer 304 is used to pulverize the limestone 302 to a suitable particle size to allow it to be suspended and carried through the rest of the process. Air 306 is also added to the pulverizer as a carrier fluid to carry and suspend the limestone particles. Accordingly, depending upon the size of the limestone material, a pulverizer 304 may or may not be needed. It should be appreciated, however, that it is possible to feed some limestone through the pulverizer 304 and to have other limestone concurrently bypass the pulverizer 304.

Since the production of smaller particle sizes of limestone will favor the development of higher BET surface area and also enhance mass transfer performance for $SO_3$ removal, in some embodiments, the pulverizer 304 may be used to produce a limestone particle size of approximately 2 μm to approximately 500 μm. In other embodiments, the desired particle size is approximately 2 μm to approximately 200 μm. In other embodiments, the desired particle size is less than 100 μm and in other embodiments less than 45 μm. Accordingly, the pulverizer 304 can be operated in such a manner to produce the desired particle size to optimize both the ability to suspend the limestone particles and the surface area.

The pulverized limestone if then fed to a calciner 308, which is a chamber in which the limestone is calcined using a FCP. In those cases where a pulverizer is not used, air may still be added to the limestone as a carrier fluid to fed the limestone to the calciner 308. The limestone is suspended in the chamber 308 and is rapidly heated to produce lime. The temperature and residence of the chamber 308 can be adjusted to provide the optimal or desired surface area of lime. In some embodiments, the temperature in the chamber 308 is approximately 400° C. to approximately 1400° C. In some embodiments, the residence time in the chamber 308 is less than approximately 30 seconds, and in other embodiments the residence time is less than approximately 5 seconds, less than approximately 3 seconds, less than approximately 2 seconds, and between approximately 0.1 second and approximately 2 seconds. The heat for the calciner 308 is provided by a burner/heater 314. Air 310 and fuel 312 are fed to the burner/heater 314 and the resulting combustion products and heat are fed to the calciner 308. The heater/burner may be a gas, oil, or coal burner, or the heat supplied to the calciner 308 may be waste heat from an external source or supplied by electrical heaters. It should be appreciated that the surface area of the lime produced will partially depend on the type of limestone or dolomite feed used, but may otherwise range from approximately 5 $m^2/g$ to less than approximately 50 $m^2/g$.

Once the limestone has been calcined and converted into a relatively high surface area lime, the suspended lime may be optionally fed to a lime hydration chamber 316. Water or steam 318 are added to the lime hydration chamber 316 to convert the lime into hydrated lime. It should be appreciated that the calciner 308 and the lime hydration chamber 316 may also be one continuous chamber. In either case, the suspended high surface area lime or hydrated lime is ready for use as described further below in connection with the removal of gaseous pollutants from a gas stream.

It should be appreciated that although FIG. 3 has been described in terms of calcining limestone into lime or hydrated lime, that dolomite may also be used as a starting material to produce lime or hydrated lime. It should also be appreciated that the process shown in FIG. 3 may be performed on-site where the suspended lime or hydrated lime will be used. In other words, the production of a suspended lime or hydrated lime provides the ability to fed that suspended material directly into a gas stream that requires treatment at the same physical location where the suspended lime or hydrated lime is produced, such as the removal of certain gaseous pollutants using a high surface area lime or hydrated lime.

Figure 4:
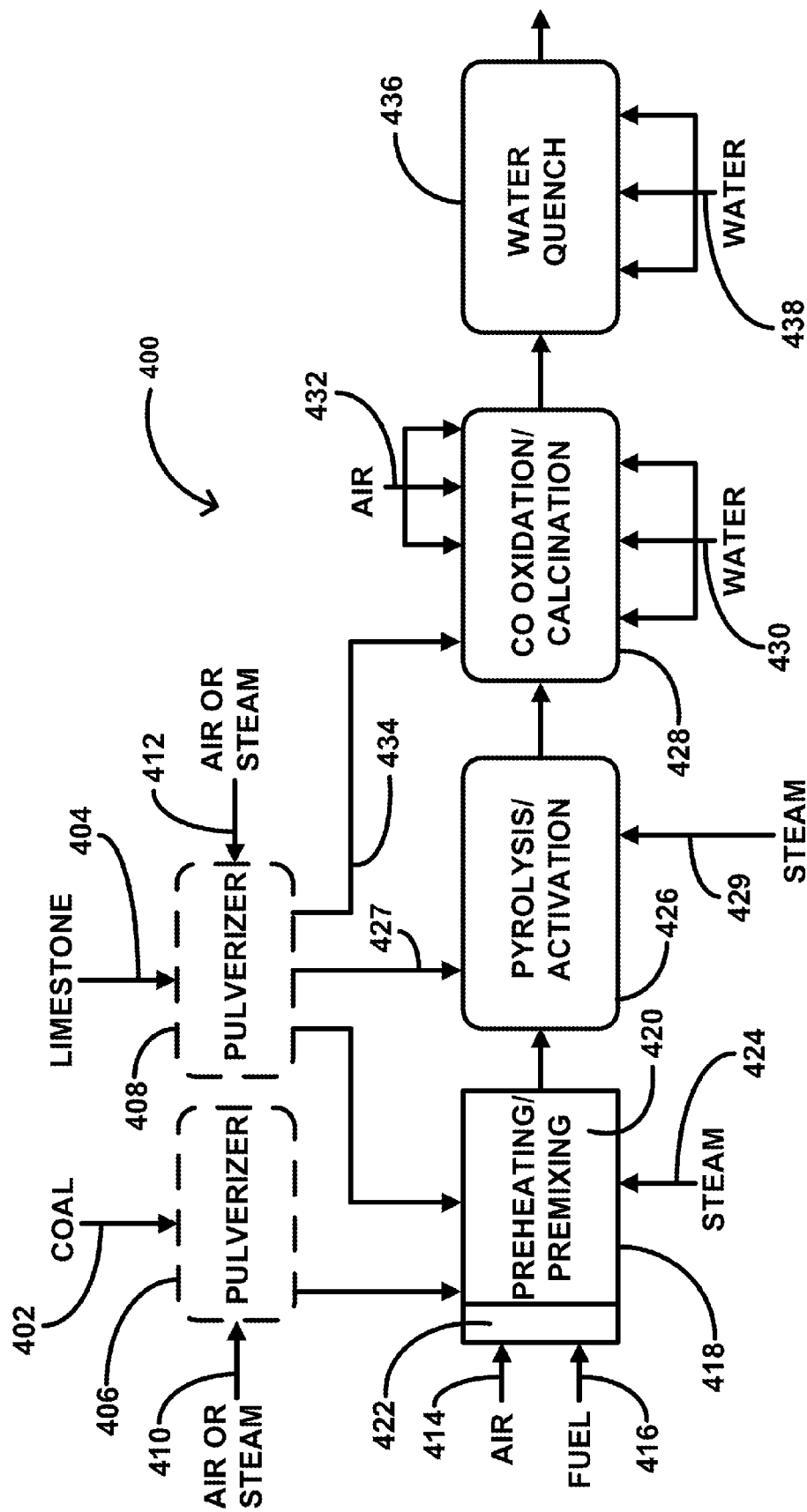
FIG. 4 is a process flow diagram for producing a high surface area lime or hydrated lime and activated carbon in accordance with one embodiment.

FIG. 4 is a process flow diagram for producing a high surface area lime or hydrated lime and an activated sorbent, such as activated carbon, in accordance with one embodiment. In this embodiment, the process 400 utilizes the same equipment for producing both a high surface area lime or hydrated lime and an activated sorbent. It should be appreciated that this equipment is typically used to produce activated carbon from coal, but in this embodiment it also is being used to concurrently produce high surface area lime from limestone. It should be appreciated that while this process is described as using limestone, dolomite may also be used as a starting material. Also, while this process is described in terms of using coal to produce activated carbon as the activated sorbent, other sorbent precursors or feedstocks, such as any other carbonaceous material, may be used alone or in combination with each other, including coal, to produce an activated sorbent.

In this process 400, coal 402 and limestone 404 are used as starting materials for the production of activated carbon and high surface area lime, respectively. These starting materials are each optionally fed into separate pulverizers 406, 408 as coal and limestone have different grindabilities and may require different pulverizers to grind to specific size. Air or steam 410, 412 are also fed, respectively, to the pulverizers 406, 408 as a carrier fluid to carry and suspend both the coal and limestone particles. The flow rate of the carrier air or steam 410, 412 should be sufficient to ensure good performance in feeding the coal 402 and limestone 404 into the pulverizers 406, 408. It should be appreciated that the particle size of the coal 402 or limestone 404 may be such that pulverization is not necessary. In this case, the coal 402 and limestone 404 can be fed directly into a chamber for preheating/mixing 418, as described below. It should be appreciated that in some embodiments, only one pulverizer is required to pulverize either the coal 402 or the limestone 404. Further, in other embodiments only a portion of the coal or limestone used requires pulverization.

As noted above in connection with FIG. 3, the production of smaller particle sizes of limestone will favor the development of higher BET surface area and also enhance mass transfer performance for $SO_3$ removal, in some embodiments, the desired particle size is approximately 2 μm to approximately 500 μm. In other embodiments, the desired particle size is approximately 2 μm to approximately 200 μm. In other embodiments, the desired particle size is less than 100 μm and in other embodiments less than 45 μm. Similarly, a smaller particle size for the coal is also favored to provide sufficient surface area for adsorption of any given gaseous pollutant. Accordingly, the pulverizers 406, 408 can be operated in such a manner to produce the desired particle sizes to optimize both surface area and suspension of the particles in the carrier fluid.

The pulverized coal 402 and the pulverized limestone 404 are fed to a preheating/premixing section 420 of an auxiliary fuel combustion chamber 418. The auxiliary fuel combustion chamber 418 has a burner section 422 to which air 414 and fuel 416 are fed and combusted to generate heat for the preheating/premixing section 420. The minimum total volume of air used in the process includes that fed to the pulverizers 406, 408 and to the auxiliary fuel combustion chamber 418 and is the amount required for complete burning (i.e., a stoichiometric amount) of the fuel 416 fed to the auxiliary fuel combustion chamber 418 and the volatile matter released from coal 402. It should be appreciated that the solid particles from the pulverizer 306 ensure some level of gas-solid mixing within the preheating/premixing section 318 before the materials exit the preheating/premixing section 420.

Steam 424 is optionally added to the preheating/premixing section 420 of the auxiliary fuel combustion chamber 418. The use of steam 424 ensures that the water vapor concentration is sufficient (e.g., greater than 20 vol. %) to activate the coal char to a higher surface area, if desired. In addition, with a higher water vapor concentration, the lime product could react with water vapor to produce a higher surface area, more reactive hydrated lime even at a relative high temperature.

The preheating/premixing section 420 is operated at a temperature of approximately 400° C. to approximately 1400° C. Accordingly, the gas phase and the solids (i.e., the coal and limestone) in the preheating/premixing section 420 are heated prior to entering a pyrolysis/activation chamber 426. This heat provides partial reaction heat for the combined coal devolatilization and calcination reactions that will occur in the pyrolyis/activation chamber 426. The temperature and residence time in the preheating/premixing section 420 is controlled to below approximately 1400° C., and in some embodiments to below approximately 700° C., and to less than approximately 100 ms, respectively, to minimize excessive devolatilization or burning of the volatile matter released from coal or calcination of the limestone. However, it should be appreciated that the limestone particles in some embodiments may be calcined in the preheating/premixing section 420 depending upon the temperature.

From the preheating/premixing section 420 of the auxiliary fuel combustion chamber 418, the coal and limestone are passed to the pyrolysis/activation chamber 426 in which the material is subject to further mixing and heating at a temperature sufficient to pyrolyze the coal, such as a temperature of less than approximately 1400° C. and in some embodiments less than 1100° C. Accordingly, the coal is activated through pyrolysis (devolatilization), and the resulting coal char is partially gasified with steam, thereby producing activated carbon. It should be appreciated that steam 429 may also be added to activate the coal through steam activation. Noting that the limestone particles may be calcined in the preheating/premixing section 420, the limestone particles will also be simultaneously calcined in the pyrolysis/activation chamber 426 at temperatures of approximately 400° C. to approximately 1400° C. to produce lime. It should be appreciated that the volatile matter released from coal during pyrolysis is burned in air in the pyrolysis/activation chamber 426 and provides additional heat for the coal devolatilization, char activation, and calcination reactions. It should also be appreciated that although this particular embodiment is described in terms of activating coal to activated carbon, the pyrolysis/activation chamber 426 can be used to produce other activated sorbents. For example, other feedstocks that could be activated using this equipment include biomass materials such as different nut shells, corn-to-ethanol byproducts, waste tires, petroleum coke, and any carbonaceous materials that can be processed into activated carbon. In addition, other inorganic materials such as bicarbonates and clay minerals that can be processed into porous sorbents can be used. Depending upon the type of carbonaceous material used, the surface are of the resulting activated carbon product may be approximately 200 $m^2/g$ to greater than approximately 600 $m^2/g$. The surface are of the lime product similarly partially depends on the type of limestone or dolomite used, but otherwise may range from approximately 5 $m^2/g$ to greater than approximately 50 $m^2/g$. Finally, it should be appreciated that limestone or dolomite from the pulverizer 408 can optionally be fed directly to the pyrolysis/activation chamber 426 via feed line 427. In this case, the addition of limestone or dolomite via the feed line 427 can be in addition to or in place of the limestone or dolomite fed to the preheating/premixing section 420 and in addition to or in place of limestone or dolomite fed to the CO oxidation/calcination chamber 426 (described below). The limestone fed via the feed line 427 directly to the pyrolysis/activation chamber 426 will also be calcined, or at least partially calcined, at temperatures above approximately 800° C. to produce lime.

The activated carbon, lime, and gaseous products are then passed to a CO oxidation/calcination chamber 428 in which any CO produced is oxidized to $CO_2$ and the limestone is concurrently calcined to produce lime, if not calcined previously, or if only partially calcined, in the pyrolysis/activation chamber 426. Water 430 and air 432 are optionally added to this chamber 428 to provide $O_2$ to oxidize the CO in the gas stream and to reduce its concentration level to below approximately 1%. The water injection rate is adjusted to quench the gas to approximately 700° C. to approximately 1100° C. This temperature range favors the kinetics of CO oxidation but also limits occurrence of carbon oxidation. The residence time of the stream in the CO oxidation/calcination chamber 324 is approximately 0.1 second to approximately 2 seconds.

It should be appreciated that limestone or dolomite can also be optionally added into the CO oxidation/calcination chamber 426 to produce additional high surface area lime via a feed line 434. Such addition may be in addition to limestone or dolomite previously fed to the preheating/premixing section 420 or limestone or dolomite previously fed to the pyrolysis/activation chamber 426 or both. It should be appreciated that the reaction for calcination of limestone is endothermic ($\Delta H=183$ kJ/mol $CaCO_3$). Therefore, if limestone or dolomite is added to the CO oxidation/calcination chamber 426 via a feed line 434, the amount of water injection 430 would be reduced to maintain the temperature range of approximately 700° C. to approximately 1100° C. It should be appreciated that the addition of water 430, air 432, and additional limestone or dolomite 434 into the CO oxidation/calcination chamber 428 will not change the properties of the activated carbon product passing through this chamber. Only a small amount of activated carbon (less than approximately 5%) may be oxidized simultaneously with the more competitive reaction of CO oxidation at this temperature range. It should be appreciated that it is also possible to only add limestone or dolomite to the CO oxidation/calcination chamber 428 rather than to both the preheating/premixing section 420 of the auxiliary fuel combustion chamber 418 and to the CO oxidation/calcination chamber 428. It should also be appreciated that in some embodiments, it may be desirable to use the pulverizer 408 to pulverize the limestone or dolomite before adding it to the CO oxidation/calcination chamber 428 via the feed line 434. The operation of the pulverizer 408 would be similar to that described above for the limestone or dolomite added to the preheating/premixing section 420 of the auxiliary fuel combustion chamber 418. The surface are of the additional lime product produced may similarly range from approximately 5 $m^2$/g to greater than approximately 50 $m^2$/g, again depending upon the type of limestone or dolomite used.

It should be appreciated that while FIG. 4 illustrates three separate chambers (i.e., the preheating/premixing section 420, the pyrolysis/activation chamber 418, and the CO oxidation/calcination chamber 426), each of these may be combined into a single chamber with separate regions. For example, a long pipe may be used where the functions of the preheating/premixing section 420, the pyroloysis/activation chamber 418, and the CO oxidation/calcination chamber 426 are performed in different regions along the pipe.

The activated carbon and lime are then passed to a water quench chamber 436 in which water 438 at a temperature of approximately 10° C. to approximately 200° C. is introduced to quench the material. In addition, this water 438 may optionally be used to convert the lime to hydrated lime (Ca$(OH)_2$). The amount of water 438 injected into the water quench chamber 436 depends on the volumetric flow rate of the gas stream carrying the activated carbon and the lime, the size of the water aerosols added, and dispersion/degree of mixing of the water aerosols in the water quench chamber 436. The minimum amount of water required for hydration of the lime is 18 grams per 56 grams of lime. It should be appreciated that in some embodiments or in particular applications, quenching of the activated carbon and lime mixture to cool the gas stream in the water quench chamber 436 is not necessary as the gas stream containing the activated carbon and lime mixture coming from the pyroloysis/activation chamber 418 can be injected at temperatures of approximately 400° C. to approximately 1100° C. directly into a gas stream containing the gaseous pollutants. Further, it should be appreciated that in some embodiments or in particular applications, quenching of the lime is not necessary to produced hydrated lime, as the lime can instead be fed directly into a gas stream containing the gaseous pollutants.

After passing through the water quench chamber 436, the stream of activated carbon and lime or hydrated lime exits the system and is ready for use as described below. Similar to the process described in connection with FIG. 3, the process described in connection with FIG. 4 may also be performed on-site where the suspended lime or hydrated lime along with the activated sorbent, such as activated carbon, will be used. In other words, the production of a suspended lime or hydrated lime and activated sorbent provides the ability to fed that suspended material directly into a gas stream that requires treatment at the same physical location where the suspended lime or hydrated lime and activated sorbent are produced, such as the removal of certain gaseous pollutants using a high surface area lime or hydrated lime and the removal of certain other gaseous pollutants using the activated sorbent.

As noted, the production of high surface area lime or hydrated lime or the use of high surface area lime or hydrated lime and an activated sorbent according to embodiments described in connection with FIGS. 3 and 4, respectively, produces a suspended lime or hydrated lime or a suspended lime or hydrated lime and an activated sorbent. As such, advantageously, the production of these materials can be performed on-site where the resulting suspended material will be used. For example, at a given physical location where a gas stream exists that requires the removal of certain gaseous pollutants, such as acid gases or certain air toxics, the processes described in connection with FIGS. 3 and 4 may be performed at that same physical location. In this case, the resulting suspended lime or hydrated lime, with our without a suspended activated sorbent, produced can be added directly to that gas stream.

Figure 5:
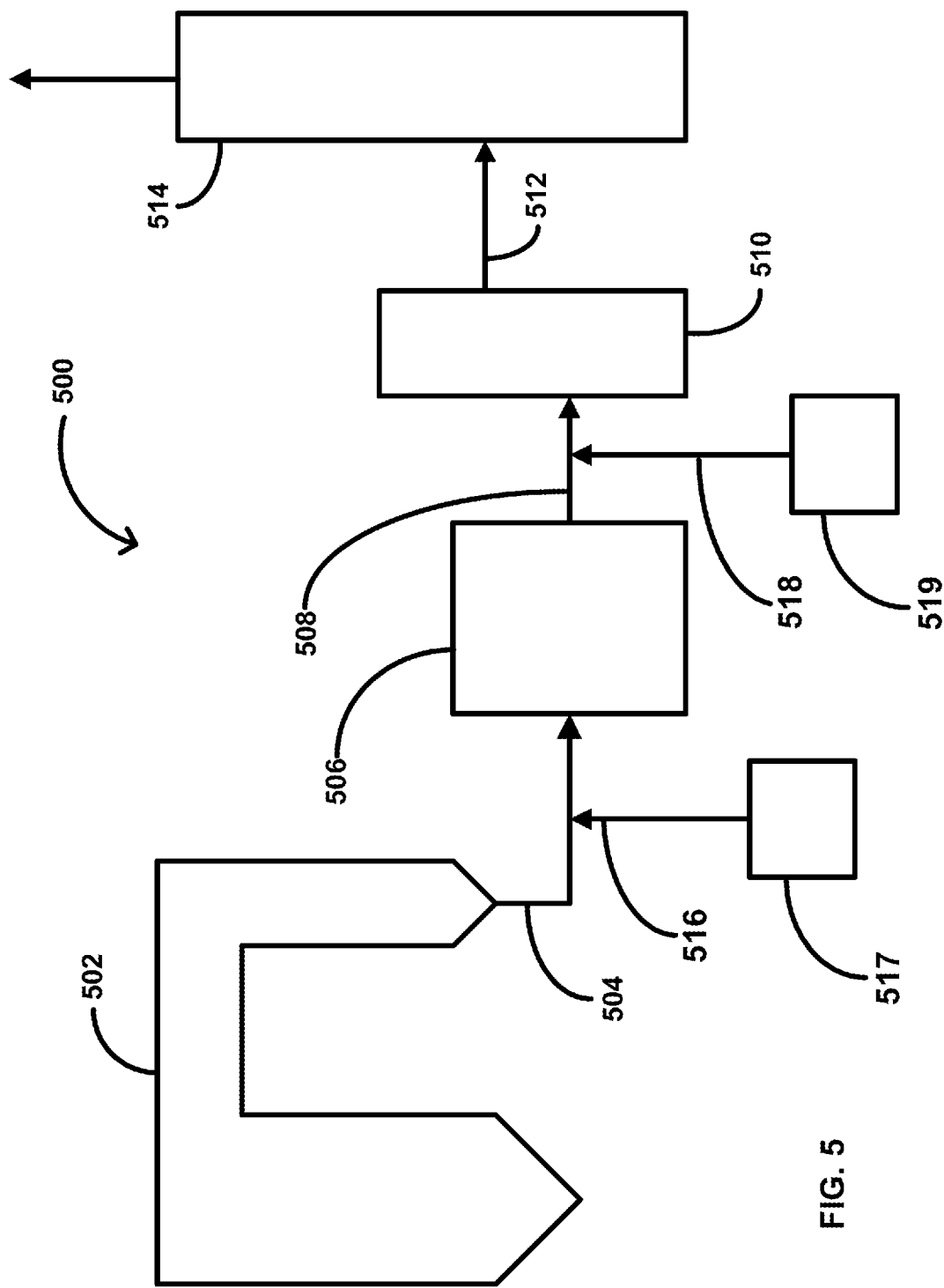
FIG. 5 is a process flow diagram for a coal-fired boiler and the use of high surface area lime or hydrated lime or the use of high surface area lime or hydrated lime and an activated sorbent, namely, activated carbon according to one embodiment.

FIG. 5 is a process flow diagram for a coal-fired boiler and the use of high surface area lime or hydrated lime or the use of high surface area lime or hydrated lime and an activated sorbent, namely, activated carbon according to one embodiment. The coal-fired combustion process 500 comprises a combustion device 502, such as a fossil-fuel-fired boiler, that uses air to combust fuel, such as coal. The combustion device 502 produces a flue gas that exits the combustion device 502 through a combustion device outlet duct 504. The flue gas produced within the combustion device 502 is comprised of air and gaseous products of combustion, such as water vapor, carbon dioxide, oxides of nitrogen and sulfur, halides, organic compounds, mercury, selenium, and other trace metal vapors and contaminants, and particulate matter. A particulate collection device 506 is connected to the combustion device outlet duct 504 and removes particulate matter from the flue gas. The flue gas then passes from the particulate collection device 506 through a particulate collection device outlet duct 508 to a scrubber 510, such as a wet scrubber, where various vaporous components or gaseous pollutants are removed from the flue gas, to a scrubber outlet duct 512. The flue gas then passes to the stack 514 where it is discharged to the atmosphere.

The suspended high surface area lime or hydrated lime produced, for example, according to the embodiments described in connection with FIG. 3 can be added to the combustion process 500 to remove certain gaseous pollutants from the flue gas, including acid gases, such as $SO_2$ and $SO_3$. Alternatively, the suspended high surface area lime or hydrated lime combined with an activated sorbent, such as activated carbon, produced, for example, according to the embodiments described in connection with FIG. 4 can be added to the combustion process 500 to remove certain gaseous pollutants from the flue gas, including acid gases, such as $SO_2$ and $SO_3$, and certain air toxics, such as mercury, respectively. In particular, the lime or hydrated lime can be used to remove acid gases, and the activated carbon can be used to remove mercury species from the flue gas. However, it should be appreciated that the lime or hydrated lime may also react with and adsorb other air toxics such as hydrogen chloride, hydrogen bromide, hydrogen fluoride, sulfur oxides, nitrogen oxides, and organic vapor and other air toxics present in trace amounts, such as selenium, arsenic, and nickel. It should also be appreciated that depending upon the particular sorbent that is activated by the methods described herein, various other vapor phase contaminants may be removed from the gas stream by adsorption onto the activated sorbent.

Specifically, the processes described in connection with FIGS. 3 and 4 above 517, 519 produce suspended lime or hydrated lime, with or without a suspended activated sorbent, such as activated carbon, 516, 518 that can be added to the flue gas at one of two locations. In one embodiment, the suspended lime or hydrated lime, with or without a suspended activated sorbent, 516 can be added directly to the combustion device outlet duct 504 upstream of the particulate collection device 506. In this case, acid gases, such as $SO_2$ and $SO_3$, can be reacted with the lime or hydrated lime thereby removing these species from the gas phase of the flue gas, and mercury species can be adsorbed by the activated carbon and also removed from the gas phase of the flue gas. The adsorbed materials can then be collected in the particulate collection device 506 and removed from the flue gas.

Alternatively, or in addition, the suspended lime or hydrated lime, with or without a suspended activated sorbent, 518 can be added directly to the particulate collection device outlet duct 508 downstream of the particulate collection device 506 and upstream of the scrubber 510. In this case, acid gases, such as $SO_2$ and $SO_3$, can be reacted with the lime or hydrated lime thereby removing these species from the gas phase of the flue gas, and mercury species can be adsorbed by the activated carbon and also removed from the gas phase of the flue gas. The adsorbed materials can then be collected in the scrubber 510 and removed from the flue gas.

Other injection points could be used along the gas path shown in FIG. 5 as well. For example, the suspended lime or hydrated lime and activated carbon could be added downstream of an electrostatic precipitator and upstream of a baghouse. In this case, the suspended lime and activated carbon are collected in the baghouse after the acid gases and air toxics are removed.

Importantly, in connection with flue gases containing both $SO_3$ and mercury, it is believed that the removal of $SO_3$ from flue gas can drastically improve mercury capture performance. As noted above, high-sulfur coals that produce flue gases with relatively higher concentrations of $SO_3$, have shown reduced mercury capture compared to flue gases with lower concentrations of $SO_3$. Therefore, removal of $SO_3$ would result in an increase in the capture of mercury. Since the reactivity of $SO_2$ with lime has been shown to increase with an increase in the surface area of lime, it is anticipated that the removal of $SO_3$ from the flue gas by reaction with higher surface area lime/hydrated lime will be relatively higher. Accordingly, it is anticipated that with a higher level of $SO_3$ removal, mercury removal by adsorption onto activated carbon will also show a corresponding increase.

Various embodiments have been described above. The descriptions are intended to be illustrative of various embodiments of the present invention and are not intended to be limiting. It will be apparent to one of skill in the art that modifications may be made to the invention as described without departing from the scope of the claims set out below. For example, it is to be understood that although embodiments have been described as producing a high surface area lime or hydrated lime for removal of acid gases, this material can also be used to remove other gaseous components. Also, certain embodiments have been described in the context of a coal-fired power plant flue gas. However, the high surface area lime or hydrated lime produced according to the embodiment described herein can be used in removing gaseous species in other types of gas streams. Further, although the production of high surface area lime or hydrated lime has been described in connection with the production and use of activated carbon for the removal of mercury species in a gas stream, other sorbents can be activated in a manner similar to that of activating carbon and combined and used with the high surface area lime or hydrated lime. In other words, the FCP is capable of being combined with other types of on-site sorbent activation processes.

What is claimed is:

1. A method for removing at least one gaseous pollutant from a gas stream, comprising:
   adding a calcium-based sorbent to a chamber;
   feeding a carbonaceous material into the chamber concurrently with said adding of said calcium-based sorbent to the chamber;
   suspending said calcium-based sorbent in the chamber;
   calcining said calcium-based sorbent in the chamber to produce suspended lime at a controllable temperature and residence time;
   activating said carbonaceous material to produce an activated sorbent using steam activation;
   feeding said suspended lime from the chamber into a separate gas duct comprising a gas stream comprising at least one gaseous pollutant; and
   reacting said lime with said at least one gaseous pollutant to remove said at least one gaseous pollutant from the gas phase of said gas stream.

2. The method of claim 1, wherein said calcium-based sorbent comprises limestone.

3. The method of claim 1, wherein said calcium-based sorbent comprises dolomite.

4. The method of claim 1, wherein said calcining comprises using flash calcination and wherein said calcium-based sorbent has a residence time within the chamber of less than 30 seconds.

5. The method of claim 4, wherein said residence time is less than 5 seconds.

6. The method of claim 5, wherein said residence time is less than 3 seconds.

7. The method of claim 1, wherein said calcium-based sorbent comprises a particle size of approximately 2 to approximately 500 microns.

8. The method of claim 7, wherein said calcium-based sorbent comprises a particle size of approximately 2 to approximately 200 microns.

9. The method of claim 1, further comprising maintaining a temperature within the chamber of approximately 400° C. to approximately 1400° C.

10. The method of claim 1, wherein said at least one gaseous pollutant comprises a trace toxic species or an acid gas.

11. The method of claim 1, wherein said at least one gaseous pollutant is selected from the group consisting of mercury, selenium, arsenic, nickel, organic vapor, hydrogen chloride, hydrogen bromide, hydrogen fluoride, sulfur oxides, nitrogen oxides, and combinations thereof.

12. The method of claim 1, wherein said carbonaceous material is selected from the group consisting of coal, biomass, oil, and combinations thereof.

13. The method of claim 1 further comprising:
feeding said activated sorbent directly into said gas stream concurrently with said feeding of said suspended lime; and
reacting said activated sorbent with at least a second gaseous pollutant to remove said second gaseous pollutant from the gas phase of said gas stream.

14. The method of claim 13, wherein said reacting said lime comprises reacting said lime with sulfur trioxide to remove said sulfur trioxide from the gas phase of said gas stream.

15. A method for removing gaseous contaminants from a gas stream, comprising:
adding a calcium-based sorbent to a chamber;
suspending said calcium-based sorbent in the chamber;
calcining said calcium-based sorbent in the chamber to produce suspended lime;
hydrating said suspended lime to produce suspended hydrated lime;
feeding said suspended hydrated lime into a gas stream comprising at least one gaseous contaminant; and
reacting said hydrated lime with said at least one gaseous contaminant to remove said at least one gaseous contaminant from the gas phase of said gas stream.

16. The method of claim 15, wherein said calcium-based sorbent comprises limestone.

17. The method of claim 15, wherein said calcium-based sorbent comprises dolomite.

18. The method of claim 15, wherein said calcining comprises using flash calcination and wherein said calcium-based sorbent has a residence time within the chamber of less than 30 seconds.

19. The method of claim 18, wherein said residence time is less than 5 seconds.

20. The method of claim 19, wherein said residence time is less than 3 seconds.

21. The method of claim 15, wherein said calcium-based sorbent comprises a particle size of approximately 2 to approximately 500 microns.

22. The method of claim 21, wherein said calcium-based sorbent comprises a particle size of approximately 2 to approximately 200 microns.

23. The method of claim 15, further comprising maintaining a temperature within the chamber of approximately 400° C. to approximately 1400° C.

24. The method of claim 15, wherein said at least one gaseous contaminant comprises a trace toxic species, an acid gas, or an air pollutant.

25. The method of claim 15, wherein said at least one gaseous contaminant is selected from the group consisting of mercury, selenium, arsenic, nickel, organic vapor, hydrogen chloride, hydrogen bromide, hydrogen fluoride, sulfur oxides, nitrogen oxides, and combinations thereof.

26. The method of claim 15, further comprising:
feeding a carbonaceous material into the chamber concurrently with said adding of said calcium-based sorbent to the chamber; and
activating said carbonaceous material to produce an activated sorbent.

27. The method of claim 26, wherein said carbonaceous material is selected from the group consisting of coal, biomass, oil, and combinations thereof.

28. The method of claim 26, wherein said activating comprises pyrolyzing and steam activation of said carbonaceous material.

29. The method of claim 26, further comprising:
feeding said activated sorbent directly into said gas stream concurrently with said feeding of said suspended lime; and
reacting said activated sorbent with at least a second gaseous contaminant to remove said second gaseous contaminant from the gas phase of said gas stream.

30. The method of claim 29, wherein said reacting said hydrated lime comprises reacting said lime with sulfur trioxide to remove said sulfur trioxide from the gas phase of said gas stream.

31. The method of claim 26, wherein said adding water or steam further comprises adding water or steam to further activate said carbonaceous material.

\* \* \* \* \*